(12) United States Patent
Zigan et al.

(10) Patent No.: US 7,841,297 B2
(45) Date of Patent: Nov. 30, 2010

(54) ANTI-PEST BIRD FEEDER APPARATUS

(76) Inventors: Robert R. Zigan, 950 120th La. North West, Coon Rapids, MN (US) 55448; Jeff Brickman, 950 120th La. North West, Coon Rapids, MN (US) 55448

(*) Notice: Subject to any disclaimer, the term of this patent is extended or adjusted under 35 U.S.C. 154(b) by 476 days.

(21) Appl. No.: 11/745,229

(22) Filed: May 7, 2007

(65) Prior Publication Data

US 2008/0276875 A1 Nov. 13, 2008

(51) Int. Cl.
*A01K 39/00* (2006.01)
(52) U.S. Cl. .................. 119/52.3; 119/57.9
(58) Field of Classification Search ............. 119/57.9, 119/52.3, 63, 908; 43/98, 99
See application file for complete search history.

(56) References Cited

U.S. PATENT DOCUMENTS

| 3,197,916 | A | * | 8/1965 | Cole, Jr. et al. | 43/66 |
| 3,388,497 | A | * | 6/1968 | Levine | 43/98 |
| D249,075 | S | * | 8/1978 | Platt | D30/124 |
| 4,867,104 | A | * | 9/1989 | Vandiver | 119/57.9 |
| 4,949,216 | A | * | 8/1990 | Djukastein | 361/232 |
| 4,969,418 | A | * | 11/1990 | Jones | 119/712 |
| 5,297,503 | A | | 3/1994 | Hibbard | |
| 5,392,732 | A | * | 2/1995 | Fry | 119/57.9 |
| 5,471,951 | A | * | 12/1995 | Collins | 119/57.9 |
| 5,864,292 | A | * | 1/1999 | Roestenberg et al. | 340/573.2 |
| 6,065,427 | A | * | 5/2000 | Peinetti | 119/57.9 |
| 6,276,298 | B1 | * | 8/2001 | Welsh | 119/52.3 |
| 6,378,458 | B1 | | 4/2002 | Boyd | |
| 7,010,882 | B2 | * | 3/2006 | Rich et al. | 43/98 |
| 7,117,819 | B2 | * | 10/2006 | Marshall | 119/428 |
| 2007/0056524 | A1 | * | 3/2007 | Barca | 119/496 |

* cited by examiner

*Primary Examiner*—Timothy D Collins
*Assistant Examiner*—Brian M O'Hara
(74) *Attorney, Agent, or Firm*—Crossley Patent Law; Mark A. Crossley

(57) ABSTRACT

An anti-pest feeder apparatus whose box contains a hinged lid. The lid and a front compartment of the box are fitted with substantially transverse exposed alternating positive and negative circuits. The remote control provides for instantly initialized current through the circuits, whether lid and box bottom, or bottom only. A master control switch turns the electronic shock potential on and off.

11 Claims, 4 Drawing Sheets

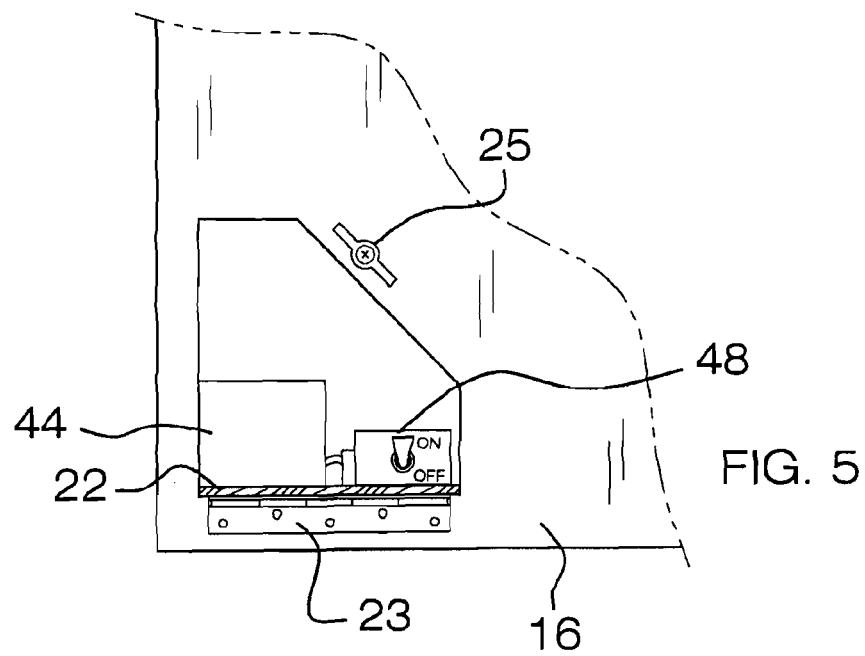
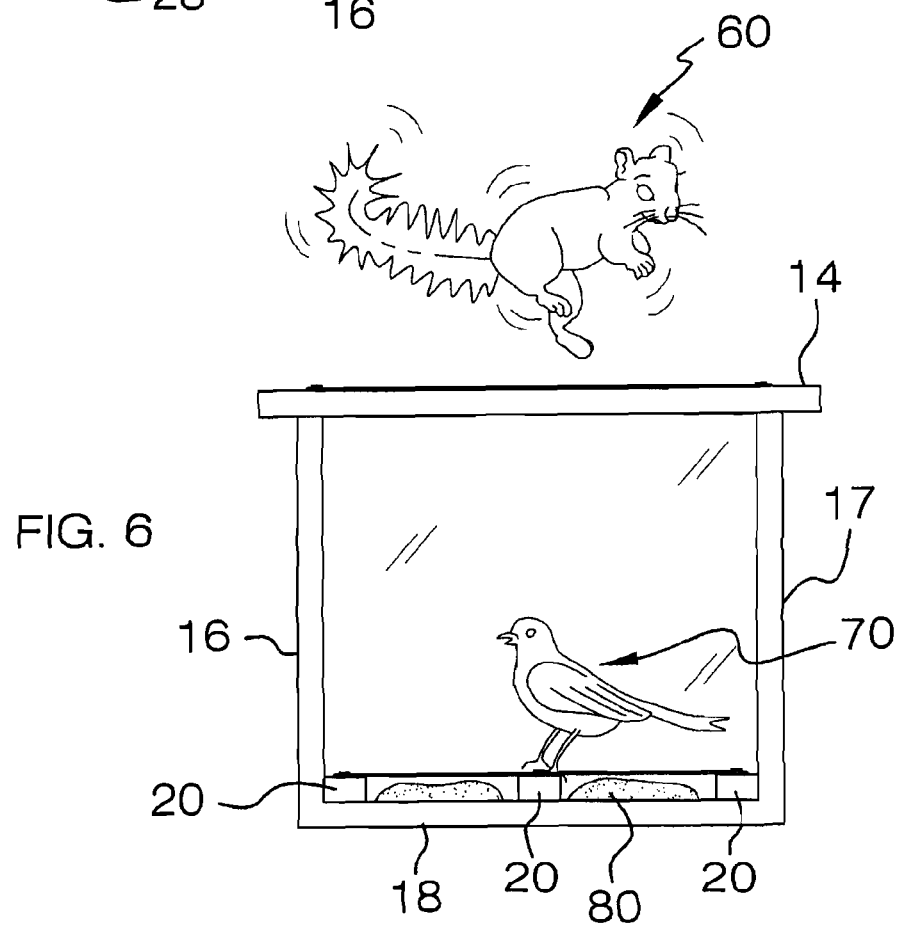

ANTI-PEST BIRD FEEDER APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Bird and animal feeders are often placed in order to attract birds and other creatures not only for feeding, but also for viewing them while feeding. A well-recognized problem exists with feeders is pest invasion. Rodents, squirrels, some birds, and other undesired animals frequent bird feeders. Preventing and deterring such pests from robbing the feeder of feed intended for preferred creatures is an age-old problem. A plethora of devices have attempted to do so; however, the devices do not provide many desirable properties. Ideally, an anti-pest feeder apparatus should provide not only for deterring pests, but also for teaching pests not to invade a feeder. Further, the ideal apparatus should enable many sizes of creature to feed and not just relegate proper operation of the apparatus to a given size creature. The ideal apparatus should offer a remote-controlled deterent for the user's convenience, because viewing birds and desired creatures is a chief factor in feeder enjoyment. The ideal apparatus should not limit a creature to highly restricted feeding and feeding positions. The present apparatus fulfills the ideal qualifications for a feeder apparatus.

1. Field of the Invention

The anti-pest feeder apparatus relates to bird and animal feeders and more especially to an electrified feeder which provides for selective pest deterrence, while also providing unrestricted feeding for desired creatures.

2. Description of the Prior Art

Prior related art does not provide operator selected deterrence of pests, nor other desirable traits of the present apparatus. As an example, U.S. Pat. No. 6,378,458B1 to Boyd on 2002 Apr. 30 teaches a feeder with electric shock capability. However, the feeder, like others in the art, requires that the pest stand on a spot and also touch a bird perch. The feeder restricts many birds from feeding, as a bird must be sized and capable of perching in order to access food. Further, larger birds, which might stand on the feeder, may also incur electric shock from touching the perch. U.S. Pat. No. 5,392,732 to Fry on 1995 Feb. 28 teaches yet another restrictive feeder with conventional port hole feeding. U.S. Pat. No. 5,297,503 to Hibbard on 1994 Mar. 29 teaches a bird feeder protector which incorporates a sweeper arm in attempt to ward off squirrels. The moving parts of the device are undesirable, as compared to the present apparatus.

While the above-described devices fulfill their respective and particular objects and requirements, they do not describe an anti-pest feeder apparatus that provides for the advantages of the present anti-pest feeder apparatus. In this respect, the present anti-pest feeder apparatus substantially departs from the conventional concepts and designs of the prior art. Therefore, a need exists for an improved anti-pest feeder apparatus.

SUMMARY OF THE INVENTION

The general purpose of the anti-pest feeder apparatus, described subsequently in greater detail, is to provide an anti-pest feeder apparatus which has many novel features that result in an improved anti-pest feeder apparatus which is not anticipated, rendered obvious, suggested, or even implied by prior art, either alone or in combination thereof.

To attain this, the anti-pest feeder apparatus provides not only for deterring pests, but also for teaching pests not to invade a feeder. By causing an unpleasant electrical shock, the apparatus teaches the pests not to return. Further, the apparatus, by selection, enables most creatures to feed, regardless of size. Birds and other animals are not restricted to various height and sizes of feeder holes or perches, but may freely feed from seed and food on the box floor. By enabling most creatures to feed from one feeder, the observers' enjoyment is increased and, further, a plurality of feeders to accommodate different sized birds and animals is not required. Additionally, the apparatus provides remote control operation. By providing remote control, a user can safely control the current to the shock circuits as desired. Further, the remote control provides separate control functions for lid and bottom feeding on the apparatus.

Thus has been broadly outlined the more important features of the improved anti-pest feeder apparatus so that the detailed description thereof that follows may be better understood and in order that the present contribution to the art may be better appreciated.

An object of the anti-pest feeder apparatus is to provide for unrestrictive feeding for most birds and small animals.

Another object of the anti-pest feeder apparatus is to provide a feeder which does not restrict observer viewing.

A further object of the anti-pest feeder apparatus is to provide a teaching tool to instruct unwanted pests not to rob food.

And, a further object of the anti-pest feeder apparatus is to provide operator selection in determining which creatures can feed.

An added object of the anti-pest feeder apparatus is to provide user interaction.

Additionally, an object of the anti-pest feeder apparatus is to provide pest deterrence with no moving parts.

These together with additional objects, features and advantages of the improved anti-pest feeder apparatus will be readily apparent to those of ordinary skill in the art upon reading the following detailed description of presently preferred, but nonetheless illustrative, embodiments of the improved anti-pest feeder apparatus when taken in conjunction with the accompanying drawings.

In this respect, before explaining the current embodiments of the improved anti-pest feeder apparatus in detail, it is to be understood that the anti-pest feeder apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved anti-pest feeder apparatus. It is therefore important that the claims be regarded as including such equivalent constructions insofar as they do not depart from the spirit and scope of the anti-pest feeder apparatus. It is also to be understood that the phraseology and terminology employed herein are for purposes of description and should not be regarded as limiting.

BRIEF DESCRIPTION OF THE DRAWINGS

FIG. 5 is a partial first side elevation view, the access door opened.

FIG. 6 is a front elevation view.

DETAILED DESCRIPTION OF THE DRAWINGS

With reference now to the drawings, and in particular FIGS. 1 through 6 thereof, the principles and concepts of the anti-pest feeder apparatus generally designated by the reference number 10 will be described.

Figure 1:
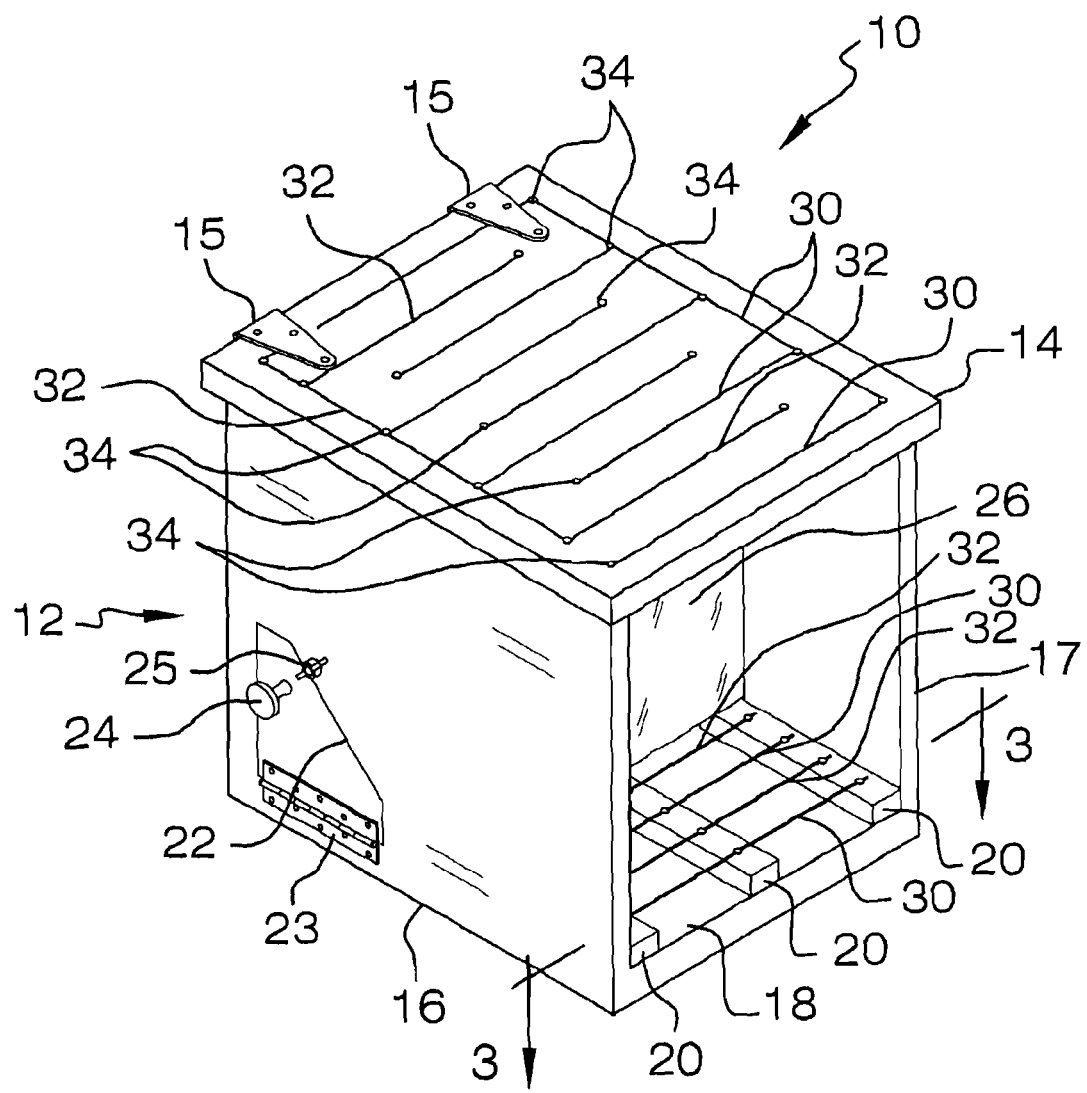
FIG. 1 is a perspective view.
Figure 2:
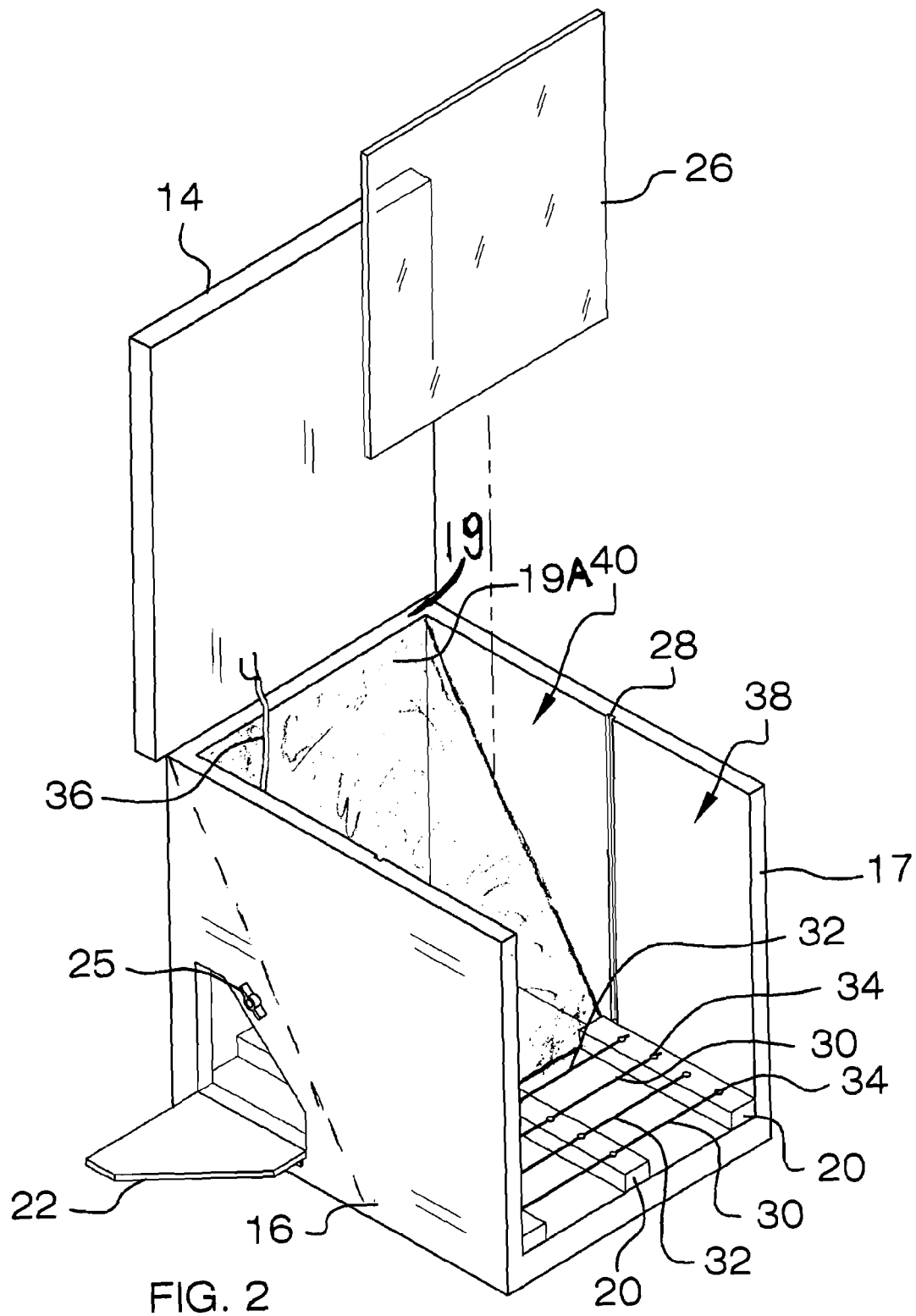
FIG. 2 is a perspective view of the lid and access door opened, the partition removed.

Referring to FIGS. 1 and 2, the feeder apparatus 10 with selective electric shock pest repelling function comprises a parallelepiped box 12. The box 12 has a first side wall 16, a second side wall 17, a back wall 19, and a bottom 18. The hinged lid 14 is provided for the box 12. The lid hinges 15 are affixed to the back wall 19. The lid 14 has a top and a bottom. A vertical groove 28 is disposed in the interior of the first side wall 16 and the second side wall 17. The groove 28 is at an approximate midpoint of the first side wall 16 and the second side wall 17. The transparent partition 26 is removably inserted within the grooves 28. The partition 26 thereby divides the interior of the box 12 into a front compartment 38 and a rear mechanical compartment 40. Slanted divider 19A provides a slanted separation for further isolation of the mechanical compartment 40 from the front portion of the box 12. Longitudinal slats 20 are disposed on the bottom 18 in the front compartment 38 of the box 12. An access door 22 is disposed in the first side wall 16. Said access door 22 accesses the mechanical compartment 40. A door hinge 23 affixes the access door 22 to the first side wall 16. A door handle 24 is disposed on said access door 22. A door latch 25 is for easier access door 22 operation. Said door latch 25 is mounted on the first side wall 16.

Figure 3:
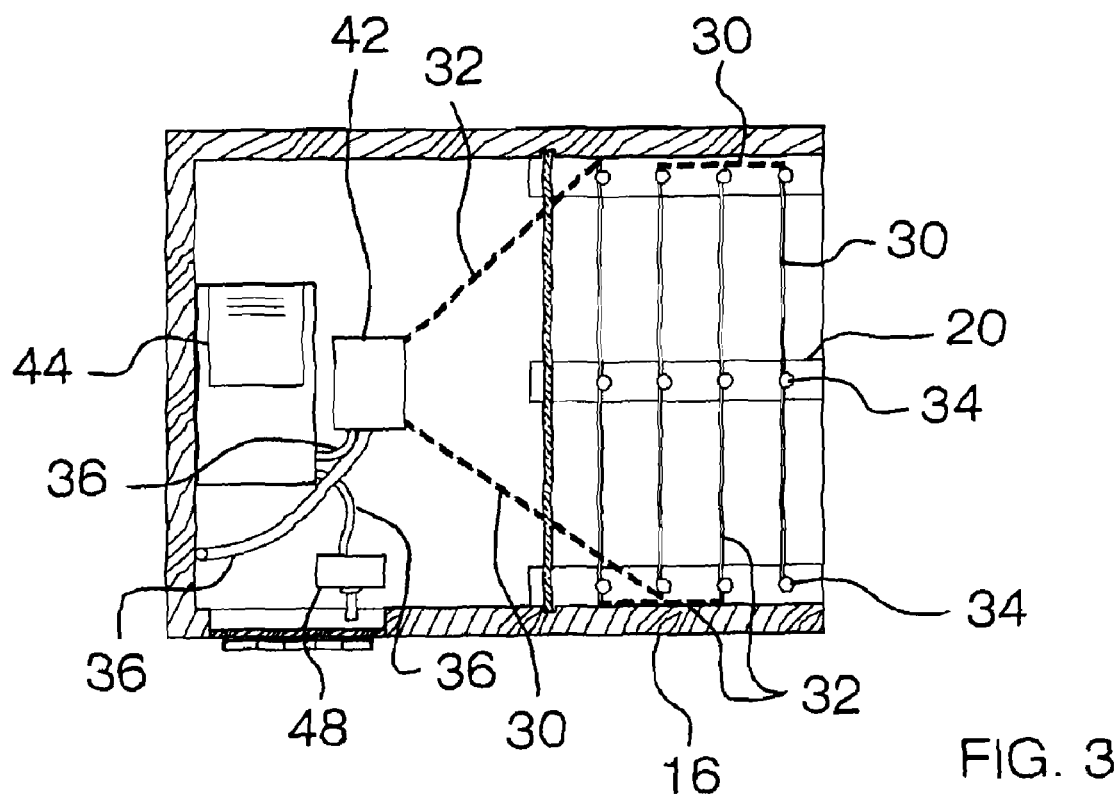
FIG. 3 is a top plan view of FIG. 1.

Referring to FIGS. 3 and 5, the mechanical compartment 40 comprises part of the electronic components. The electronic components contained within said mechanical compartment 40 are comprised of a battery/receiver 44, a distributor 42, and a control switch 48. The control switch 48 is positioned adjacent to the access door 22 for easiest switching. The control switch 48 provides for safety in transporting or in servicing the apparatus 10, at the same time providing a master on/off control. Combined wire 36 provides electrical communication between the electronic components. A plurality of insulated terminals 34 is disposed on the slats 20. Additionally, a plurality of insulated terminals 34 is disposed on the lid 14 top. Exposed negative circuits 32 and exposed positive circuits 30 are alternately disposed in transverse array upon the terminals 34. The negative circuits 32 and positive circuits 30 are stretched from terminal 34 to terminal 34. Spacing between negative circuits 32 and positive circuits 30 ensures separate circuit integrity. At the same time, the alternate spacing of positive circuits 30 and negative circuits 32 provides for unwanted creatures, such as squirrels 60 and rodents and other pests, to engage a positive circuit 30 and a negative circuit 32 simultaneously, and incur electrical shock when triggered by the remote control 50. The shock teaches such pests not to return to the apparatus 10. Further, by positioning positive circuits 30 and negative circuits 32 on top of the box 12, pests cannot hang from above and feed upon bird seed 80 and other food on the box 12 bottom 18.

Figure 4:
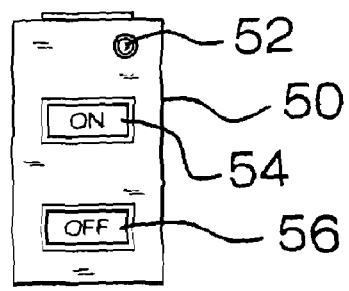
FIG. 4 is a top plan view of the remote control.

Referring to FIGS. 3 and 4, the remote control 50 is provided for selectively initializing potential current through the negative circuits 32 and positive circuits 30 via the battery/receiver 44. The battery/receiver 44 in turn engages the distributor 42 to send current to the negative circuits 32 and positive circuits 30. The remote control 50 comprises an on rocker 54. With the control switch 48 on and the on rocker 54 on, current is potentially supplied to lid positive circuit 30 and negative circuit 32. Simultaneously, current is potentially supplied also to the positive circuit 30 and negative circuit 32 on the slats 20 of the bottom 18. Potential current is activated via pushing the activator 52. The off button 56 supplies current potentially to the positive circuit 30 and negative circuit 32 of the bottom 18 only. The operator thereby controls areas of electrical shock.

As an example of use, an operator of the apparatus 10 might wish to activate only the lid 14 positive circuit 30 and negative circuit 32. Thus, in the event a desired creature is feeding from the bottom 18 while an undesired pest is simultaneously attempting to feed from the lid 14, the user may choose when to push the activator 52 to shock the undesired pest located upon the lid 14, while not harming a desired creature feeding from the bottom 18. Further, the user may choose to electrify both the lid 14 and bottom 18 via the on-rocker 54 to shock any undesirable creatures on lid 14 and bottom 18 as chosen, via the activator 52.

With respect to the above description then, it is to be realized that the optimum dimensional relationships for the parts of the anti-pest feeder apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the anti-pest feeder apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the anti-pest feeder apparatus may be used.

Therefore, the foregoing is considered as illustrative only of the principles of the anti-pest feeder apparatus. Further, since numerous modifications and changes will readily occur to those skilled in the art, it is not desired to limit the anti-pest feeder apparatus to the exact construction and operation shown and described, and accordingly, all suitable modifications and equivalents may be resorted to, falling within the scope of the anti-pest feeder apparatus.

What is claimed is:

1. A bird and animal feeder apparatus with selective electric shock pest repelling function, the apparatus comprising:
   a parallelepiped box, the box having a first side wall, a second side wall, a back wall, and a bottom;
   a lid for the box, the lid having a top and a bottom;
   a removable transparent partition continuously disposed between the first side wall and the second side wall, wherein the partition divides an interior of the box into a front compartment and a mechanical compartment, the mechanical compartment comprising electronic components comprised of:
   a battery/receiver;

a distributor;
a control switch;
electrical communication between the electronic components;
a slanted interior divider disposed between the first side wall and the second side wall and further disposed between the transparent partition and the back wall;
an access door in the first side wall, the access door accessing the mechanical compartment;
a door hinge affixing the access door to the first side wall;
a door handle on the door;
a door latch for the access door, the door latch mounted on the first side wall;
at least two longitudinal slats disposed on the bottom in the front compartment;
a plurality of insulated terminals on the slats;
exposed negative and positive circuits alternately disposed in transverse array upon the terminals, the circuits in communication with the distributor;
means for selectively activating the negative and positive circuits.

2. The apparatus according to claim 1 further comprising a pair of lid hinges affixing the lid to the back wall.

3. The apparatus according to claim 1 further comprising a vertical groove in an interior of the first side wall and the second side wall, the groove at an approximate midpoint of the first side wall and the second side wall, the partition removably fitted within the grooves.

4. The apparatus according to claim 2 further comprising a vertical groove in an interior of the first side wall and the second side wall, the groove at an approximate midpoint of the first side wall and the second side wall, the partition removably fitted within the grooves.

5. A bird and animal feeder apparatus with selective electric shock pest repelling function, the apparatus comprising:
a parallelepiped box, the box having a first side wall, a second side wall, a back wall, and a bottom;
a lid for the box, the lid having a top and a bottom;
a removable transparent partition continuously disposed between the first side wall and the second side wall, wherein the partition divides an interior of the box into a front compartment and a mechanical compartment, the mechanical compartment comprising electronic components comprised of:
a battery/receiver;
a distributor;
a control switch;
electrical communication between the electronic components;
a slanted interior divider disposed between the first side wall and the second side wall and further disposed between the transparent partition and the back wall;
an access door in the first side wall, the access door accessing the mechanical compartment;
a door hinge affixing the access door to the first side wall;
a door handle on the door;
a door latch for the access door, the door latch mounted on the first side wall;
at least two longitudinal slats disposed on the bottom in the front compartment;
a plurality of insulated terminals on the slats;
a plurality of insulated terminals on the lid top;
exposed negative and positive circuits alternately disposed in transverse array upon the terminals of the slats and of the lid top, the circuits in communication with the distributor;
means for activating the negative and positive circuits.

6. The apparatus according to claim 5 further comprising lid hinges affixing the lid to the back wall.

7. The apparatus according to claim 5 further comprising a vertical groove in an interior of the first side wall and the second side wall, the groove at an approximate midpoint of the first side wall and the second side wall, the partition removably fitted within the grooves.

8. The apparatus according to claim 6 further comprising a vertical groove in an interior of the first side wall and the second side wall, the groove at an approximate midpoint of the first side wall and the second side wall, the partition removably fitted within the grooves.

9. A bird feeder apparatus with selective electric shock pest repelling function, the apparatus comprising:
a parallelepiped box, the box having a first side wall, a second side wall, a back wall, and a bottom;
a lid for the box, the lid having a top and a bottom;
a pair of lid hinges affixing the lid to the back wall;
a vertical groove in an interior of the first side wall and the second side wall, the groove at an approximate midpoint of the first side wall and the second side wall;
a transparent partition removably inserted within the grooves, the partition continuously disposed between the first side wall and the second side wall, thereby dividing an interior of the box into a front compartment and a mechanical compartment, the mechanical compartment comprising electronic components comprised of:
a battery/receiver;
a distributor;
a control switch;
electrical communication between the electronic components;
a slanted interior divider disposed between the first side wall and the second side wall and further disposed between the transparent partition and the back wall;
an access door in the first side wall, the access door accessing the mechanical compartment;
a door hinge affixing the access door to the first side wall;
a door handle on the door;
a door latch for the access door, the door latch mounted on the first side wall;
at least two longitudinal slats disposed on the bottom in the front compartment;
a plurality of insulated terminals on the slats;
a plurality of insulated terminals on the lid top;
exposed negative and positive circuits alternately disposed upon the terminals of the slats and of the lid top, the circuits in communication with the distributor;
a remote control for selectively initializing current through the circuits of the slats and of the top, the remote control comprising:
an on rocker;
an off button;
an activator.

10. The apparatus according to claim 9 wherein the on rocker further dictates control for potential current through the circuits of the slats and the circuits of the top.

11. The apparatus according to claim 10 wherein the off button further dictates current potential through the circuits of the slats only.

* * * * *